Feb. 25, 1936.  H. S. LEE  2,032,135
PROCESS AND APPARATUS FOR BURNING FUEL
Original Filed Feb. 13, 1932  3 Sheets-Sheet 3
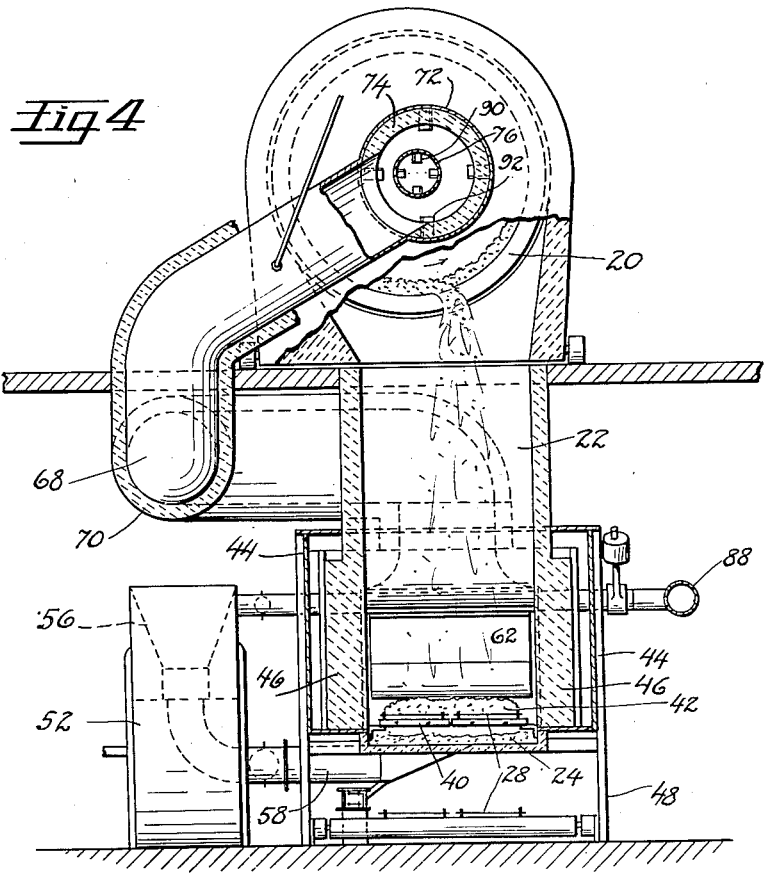
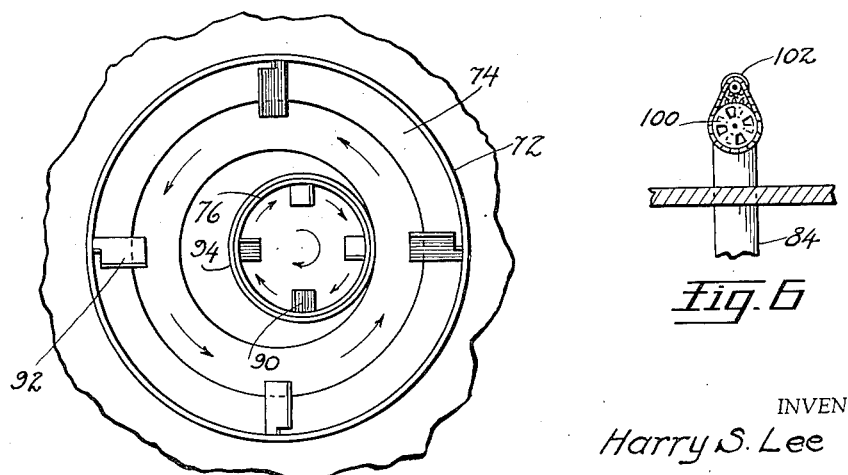
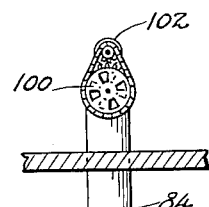
INVENTOR.
Harry S. Lee
BY Parker & Burton
ATTORNEYS.

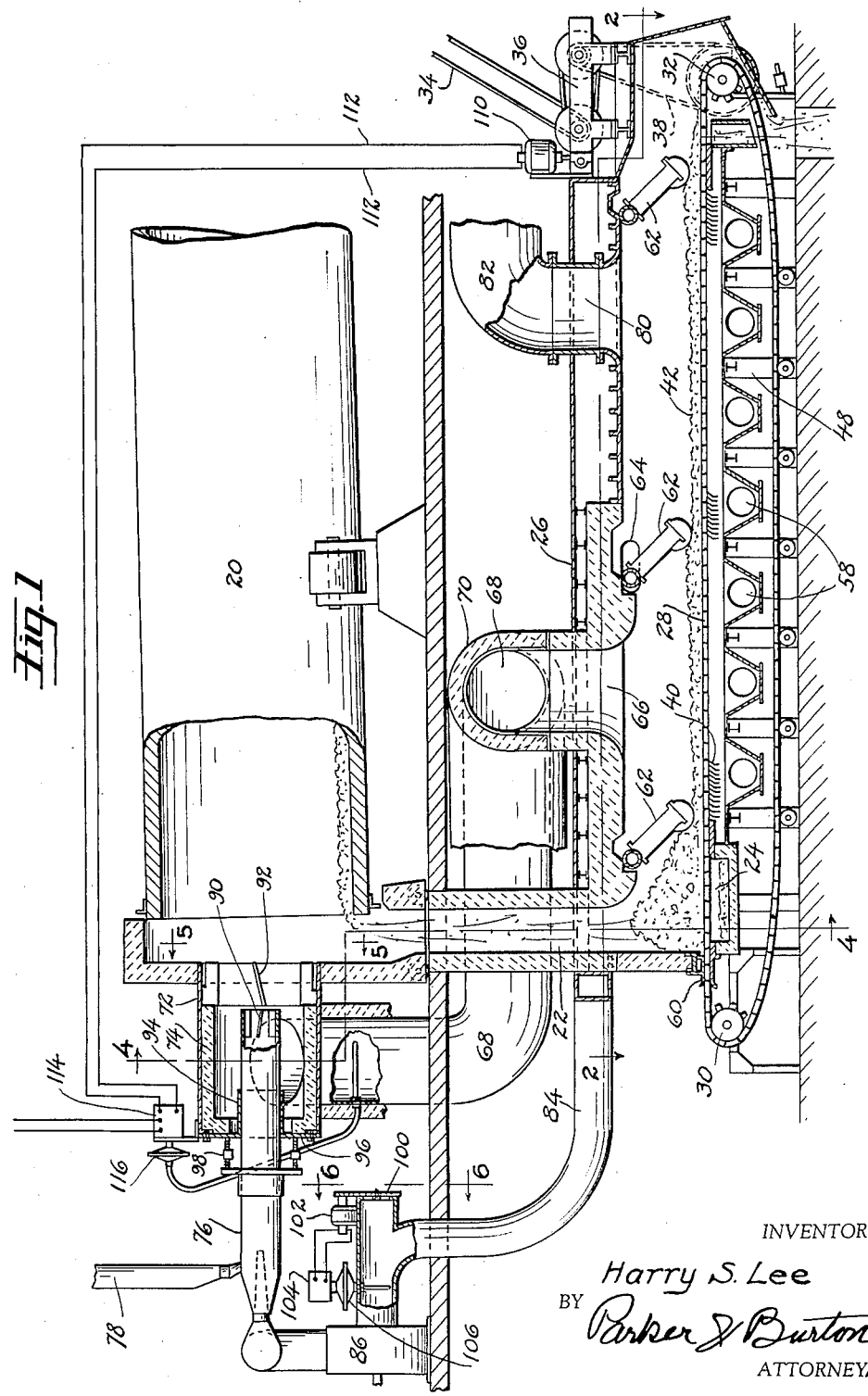

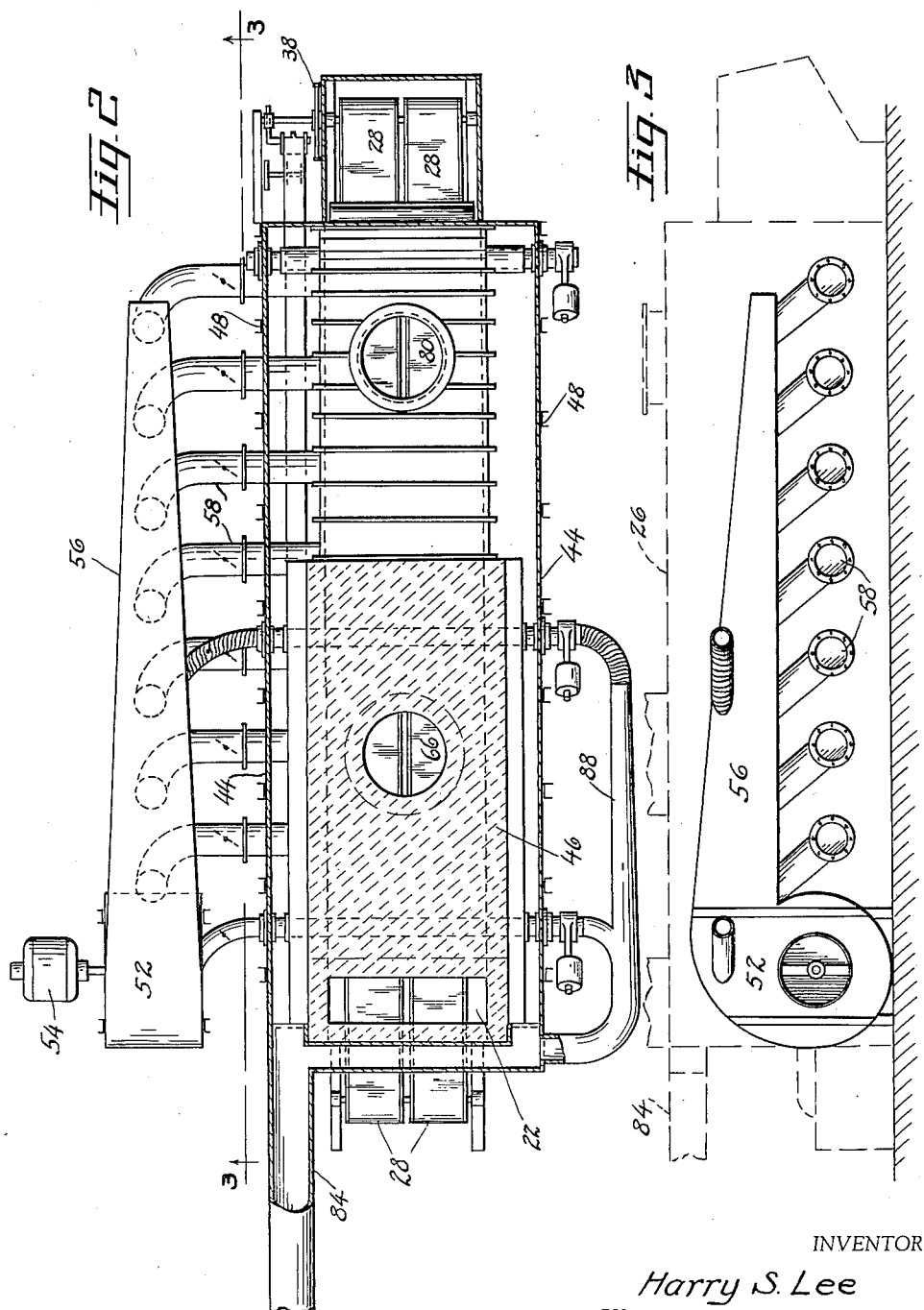

Patented Feb. 25, 1936

2,032,135

UNITED STATES PATENT OFFICE 2,032,135

PROCESS AND APPARATUS FOR BURNING FUEL

Harry S. Lee, Detroit, Mich.

Original application February 13, 1932, Serial No. 592,774. Divided and this application October 4, 1934, Serial No. 746,839

7 Claims. (Cl. 110—104)

My invention relates to improvements in the process and apparatus for manufacturing, treating and cooling cement clinker. This application forms a division of my copending application Serial No. 592,774, filed February 13, 1932. More particularly, the invention described hereinafter relates to improvements in the method and apparatus for producing the intensely hot flame which is directed into the conventional rotating cement kiln.

An object of this invention is to provide an improved process and apparatus whereby an improved clinker is produced at reduced cost. A feature of my invention is the provision of such a process and apparatus whereby the kiln within which the clinker is formed is caused to function in a most efficient manner and at a reduced cost.

Another object of my invention is to provide an improved method and apparatus for preheating the air for the burner and for introducing and commingling this preheated air with the fuel as the latter is discharged from the fuel feed mechanism into the kiln.

Another object of my invention is to provide flames of combustion for the kiln which are clean, possessing practically no black portions, and which completely burn all the fuel in a very short flame travel thereby liberating an extremely high heat immediately upon emission from the burner and as the flames enter the kiln.

Another object of my invention is to provide a novel method of mixing the preheated air with the fuel and to provide a novel construction associated with the burner to assist in the mixing of the air with the fuel. It is an important feature of my invention to provide separate air currents for the burner, one of which originates in a relatively low temperature source and is delivered as primary air into the fuel feed pipe to eject the fuel therefrom, and the other of which originates in a relatively high temperature source and is delivered as secondary air about the discharge end of the fuel feed pipe so that it mixes and reacts with the fuel only after the fuel is discharged from said pipe by the primary air.

Another important feature of my invention is the temperature relationships of the primary air and the secondary air to each other and to the initial combustion temperature or flash point of the particular fuel employed. It is this temperature relationship of these gases and fuels as well as their locations at the point of mingling which enable the gases and fuels to easily and intimately mix together so that a clean, quick, intensely hot combustion occurs in the burning zone of the kiln.

Another object is to deliver the primary air into the kiln through the fuel feed apparatus at a temperature maintained below a predetermined maximum so as to prevent pre-ignition or destructive distillation of the fuel thereby. This primary air is delivered, however, at as high a temperature as is compatible with the characteristics of the fuel being used so that the kiln may be maintained in operation with the minimum amount of fuel.

It is an object of my invention to preheat the secondary air to a temperature above the flash point or destructive distillation temperature of the fuel employed, preferably to preheat this air to a temperature exceeding two times the temperature of the initial combustion of the fuel, and to deliver this preheated secondary air to the burner in the form of a hot envelope surrounding the discharge end of the fuel feed mechanism. As a result, the relatively colder jet of primary air and fuel issuing from the fuel feed pipe of the burner is expanded into the hotter secondary air jet so that a quick and easy mixing of the gases is produced and combustion of the fuel immediately takes place. Vanes may be employed for producing swirls and turbulences in the primary and secondary air jets, and these vanes may be arranged to cause these air jets to whirl in directions opposite to one another thereby increasing the intimacy of the mixing.

A further object is to appreciably control the functioning of the kiln through control over the air delivered to the burner and a subsidiary object is to control the characteristics of this air, whether temperature, or volume, either manually or automatically.

In carrying out my improved process in the embodiment of the invention described herein, I provide means for cooling the clinker after it passes from the kiln. Of the air which is employed to cool the clinker, a selected portion which has been raised to a relatively high temperature is delivered into the kiln. This air, termed the secondary air, is delivered into the kiln at a temperature substantially above the initial distillation or combustion temperature of the particular fuel used in the kiln, for example, between 900° and 1200° Fahr. This air is delivered at such a temperature and in such a quantity and manner to the kiln as to measurably affect the heat in the kiln and the combustion which occurs therein. In this manner I am able to appreciably control the functioning of the kiln.

A second quantity of air, termed the primary air, is collected and preheated in the vicinity of the cooling chamber to a temperature slightly below the initial combustion temperature or flash point of the particular fuel used in the kiln. This primary air is then introduced into the fuel feed pipe under pressure and ejects the fuel from the pipe at the same time it mixes therewith.

In order that this process may be carried out in a most efficient manner, an enclosure or "bustle" is constructed around the discharge end of the fuel feed pipe which injects the ignited fuel into the kiln. The highly heated secondary air is delivered in predetermined quantities to the bustle. The bustle is arranged to direct the secondary air forwardly, longitudinally of the fuel feed pipe, so that as the fuel and primary air emerge from the pipe they are surrounded by a hot envelope of air, which, because of its high temperature, immediately causes the fuel to ignite. The fuel, having been prepared almost to the point of ignition by the primary air, quickly burns upon contact with the secondary air, and all the fuel is consumed in a relatively short distance of flame travel.

Various other objects and advantages of my invention will more fully appear from the following specification, appended claims, and accompanying drawings, wherein:

Figure 1 is an elevation of a structure embodying my invention shown also partly in section, Fig. 2 is a horizontal sectional view taken on line 2—2 of Fig. 1 and showing a portion of the cooling chamber in plan, Fig. 3 is a longitudinal sectional view taken on line 3—3 of Fig. 2, Fig. 4 is a cross sectional view taken on line 4—4 of Fig. 1, Fig. 5 is an enlarged fragmentary elevation taken on line 5—5 of Fig. 1, and Fig. 6 is a view taken on line 6—6 of Fig. 1.

A general arrangement of the apparatus employed by me and utilized to carry out my process is shown in Fig. 1 wherein a rotary cement kiln of conventional type is indicated at 20. This kiln is adapted to discharge cement clinker from its lower end through a vertical passageway 22 as shown in Figs. 1 and 4. This clinker falls into a receptacle 24 in a cooling chamber indicated generally in Fig. 1 as 26. The receptacle 24 is arranged underneath a travelling drag chain 28 which passes through the chamber and is carried on sprocket wheels 30 and 32. A driving belt is indicated as 34 which is adapted to drive at varying rates of speed, through variable speed drive mechanism 36, a belt 38 to actuate the drag chain 28 to move at varying rates of speed. The chain travels over a stationary grate 40. Cement clinker 42 is supported on the grate and actuated by the chain. The receptacle 24 is arranged underneath the forward end of the chain below the chute 22 so that the clinker falls therein as more fully described in my Patent No. 2,012,881.

The receptacle 24 and drag chain 28 are slightly offset radially from the axis of the rotating kiln as shown in Fig. 4. During the rotation of the kiln the cement clinker rides up on the side toward which the kiln is rotating. By this offsetting the clinker stream falls directly into the receptacle 24 and upon the moving drag chain. This is one feature of the construction.

The cooling chamber is jacketed as shown in the drawings particularly in Figs. 2 and 4 at 44. The inner refractory wall of the cooling chamber is indicated at 46. The entire cooling chamber is supported upon suitable standards 48. Reference is made to my above noted copending application Serial No. 592,774 for a more detailed description of the construction and operation of the cooling chamber. Suffice to say that a suitable blower 52 driven by a controlled variable speed electric motor 54 communicates with a manifold 56 which is provided with a series of feed pipes 58 leading into the cooling chamber as shown particularly in Figs. 1, 2, 3, and 4. These feed pipes deliver air into the chamber below the grate 40 and the air moves up through the grate and about the cement clinker which is being advanced over the grate by the drag chain 28. Means is employed as described in the parent application for collecting any of the fine particles of cement clinker which fall through the grate as the drag is advanced.

The travelling conveyor or drag chain 28 enters the cooling chamber through any appropriate sealing mechanism 60, such as that described and claimed in my patent, No. 1,941,560.

The air which enters the chamber through the plurality of pipes 58 and which goes up through the grate and about the cement clinker being carried through the chamber is segregated so that a selected portion of the hottest air is taken into the kiln. It will be seen that the chamber is provided with a plurality of dividing gates or valve like levelling devices indicated generally by the number 62. These gates are hollow, air cooled structures and three of them are shown. The gates or valves are described and claimed in my patent, No. 1,941,561. For the purpose of this application it is to be noted that these gates function to divide the cooling chamber into several isolated compartments, and that it is by means of these compartments that selected portions of the cooling air may be collected and delivered to the kiln. These gates also serve the purpose of leveling devices as well as preventing air flow from one compartment to the other. The gate nearest the entrance of the cement clinker into the cooling chamber serves as a barrier to prevent air from flowing backwardly up through the clinker chute. The intermediate gate is longitudinally adjustable within a slot 64 in the wall of the chamber. As described in my parent application this adjustment is for varying the relative size of the two compartments formed by this intermediate gate between the two end gates. By such an adjustment, the volume of air collected in either of these compartments can be varied.

The cooling chamber is provided with a pair of air outlets one for each compartment formed by the intermediate gate structure. The outlet 66 leads from the forward compartment and the air driven therethrough is carried by the pipe 68, insulated with refractory as at 70, to discharge into the cylindrical enclosure or "bustle" 72 which encircles the fuel feed pipe 76. The temperature of this air is maintained at its highest possible factor of efficiency compatible with the functioning of the machine as, for example, 900° to 1200° Fahr. Fuel enters this feed pipe 76 through an intake 78 and is driven by what is termed the "primary air" the system of which will be later described, through such feed pipe 76 into the kiln. This feed pipe is of suitable heat resisting alloy.

There is an outlet 80 from the rear compartment of the cooling chamber and from which air is taken by a pipe 82 to a suitable stack for exhaust.

The space between the two walls of the cooling chamber, shown particularly in Figs. 2 and 4, is the jacketed portion through which air is taken from the tail or discharge end of the cooling chamber by means of the conduit 84 as shown in Fig. 2. This air, termed the "primary air", after passing through the jacketed portion is driven by a control motor and the air passes from the blower 86 into a portion of the fuel feed pipe 76 as shown in Fig. 1 and is used to drive the fuel into the kiln. The manifold 88 which collects the air from the hollow gate shafts 62 leads into the conduit 84.

This air should be taken off at as high a temperature as is possible but which will not induce pre-ignition of the fuel, and with the fuels conventionally used a temperature of 250° to 400° Fahr. has been found suitable. At such temperatures the air, which is mixed with the fuel, is at a temperature close to the point of distillation of the fuel but sufficiently below such point so that combustion will not occur prematurely. This air drives the fuel through the feed pipe 76.

This feed pipe is provided with deflectors 90 so that fuel and air enter the enclosure or bustle 72 in a turbulent swirling condition. This mixed fuel and air is picked up in the enclosure 72 by the large stream of air entering through tube 68. This air, as heretofore stated, is very highly heated. Combustion occurs immediately and the fuel and air are swept into the kiln so that the combustion takes place at the very entrance into the kiln. The enclosure or bustle 72, which is also insulated as at 74, is provided with deflectors 92 which set up a swirl of these burning particles in a direction opposite to the direction of rotation of the kiln.

The feed pipe 76 is carried by a thimble 94 forming an extension of a plate 96 secured over the end of the enclosure as shown in Fig. 1. It is axially adjustable through such thimble by an adjustment indicated generally as 98 which may be of a turnbuckle character.

The temperature of the air entering through the tube 84 into the blower 86 is maintained by a thermostatically controlled device which admits atmospheric air as shown in Figs. 1 and 6. This includes a valve structure 100 which is operated from a reversible electric motor 102. Reversible movement of this motor is controlled by a switch 104. The switch is controlled by a thermostat 106 so positioned as to be responsive to the temperature of the air entering the blower so as to maintain a temperature at approximately a predetermined point. This point is below the pre-ignition temperature of the fuel as heretofore described.

To maintain the temperature of the air entering through the inlet 68 at the high temperature required to give the maximum efficiency to the kiln there is provided a speed controlling mechanism in the form of a conventional variable speed drive device 36, heretofore referred to, which regulates the travel of the drag chain 20. This variable speed mechanism is controlled by a reversible electric motor 110 which is in circuit as indicated at 112 with a control switch 114. This switch is itself controlled by a thermostat 116 responsive to the temperature in the pipe 68. The reversing movements of this motor as they regulate the variable speed mechanism speed up or slow up the movement of the drag chain 20. The variable speed device is provided with a master manual control, not specifically illustrated as the same is conventional apparatus, so that the movement of the drag chain may be manually regulated.

It is apparent that speeding up of the drag chain will cause the bed of cement clinker to thin out. Slowing up of the drag chain will cause the cement clinker to pile up and increase in thickness in the bed. In this manner the temperature of the air passing through the pipe 68 may be regulated. Controlling the temperature of the secondary air as above described is specifically disclosed and claimed in the parent application of which this is a division.

It is therefore possible to control the functioning of the kiln so that notwithstanding the normally erratic character of the functioning of a device of this kind an optimum of efficiency is maintained. The cement forming aggregate in passing through the kiln tends to collect in ridges or portions of varying depth and combustion in a normal kiln is therefore interfered with. In my construction maximum efficiency is maintained because of the fact that such a large percentage of air is admitted directly at a normally constant temperature.

It is likewise apparent that in this manner the quantity of fuel consumed is very materially reduced. In the functioning of a cement kiln it is necessary that there be maintained a definite proportion as to fuel and air to secure maximum efficiency. An excess of fuel or air interferes with this balance or equilibrium. By the method I have shown and through the use of the apparatus disclosed it is possible to control, to a measurable degree, the temperature within the kiln. This control is secured by a control exercised over the secondary air passing through the pipe 68. The remaining air, which is needed for combustion, is taken in with the fuel feed, allowance being made as is always necessary for such leakage as will naturally occur, and the amount of which can be reasonably predetermined.

In the operation of the embodiment disclosed herein, the passage of the primary air with the fuel through the burner feed pipe prepares the fuel for immediate combustion upon contact with the relatively hotter secondary air. The secondary air is conducted to the enclosure or bustle 72 in an intensely heated condition with temperatures ranging from 900° to 1200° Fahr., these temperatures being preferably more than twice as much as the initial combustion temperature of the fuel. The secondary air is introduced into the bustle through inlet 69 in rear of the discharge end of the fuel pipe and by the time the secondary air reaches the discharge end of the pipe it is travelling longitudinally of the pipe and surrounds the same. As a result there is obtained at the discharge end of the fuel feed pipe a swirling annular current of highly heated air which is above the initial combustion temperature of the discharged fuel. This highly heated current of air causes the primary air as it emerges from the fuel pipe to be heated so that it expands quickly into the hotter air enveloping it and mingles intimately therewith. Vanes 90 and 92 as indicated in Fig. 5 produce swirls of opposite directions in the two air streams. Hence there are two forces tending to produce quick and easy mixing of the air streams with the fuel, the rotation of the secondary air opposite to that of the primary air and the expansion of the primary air into the hotter surrounding secondary air.

The source of the secondary air in the cooling chamber is at a location where the clinker is relatively free from the dust created by the discharge of clinker into the cooling chamber, thereby largely eliminating dust from the secondary air stream enabling a cleaner and hotter flame to be produced. Furthermore, this secondary air is conducted to the bustle by a path separate from the chute 22 through which the clinker falls. By such an arrangement the secondary air is prevented from collecting any undesirable quantity of clinker dust which exists in the chute. The secondary air instead of being delivered through the chute in the conventional manner is conducted to the bustle in rear of the discharge end of the fuel feed pipe.

Introducing the secondary air into the burner through the bustle rather than through the chute further eliminates the formation of an undesirable insulating air blanket between the flames of combustion and the clinker in the kiln which would occur if the secondary air were conducted up through the chute. The occurrence of this insulating air blanket is readily apparent when it is realized that a large portion of the secondary air rising in the chute would enter the kiln between the flames of combustion and the cement clinker on the floor of the kiln. The embodiment herein has eliminated this objectionable occurrence and accordingly a better heat transfer takes place between the flames and the clinker in the kiln.

What I claim:

1. That method of forming a fuel mixture and delivering the same into a combustion zone which comprises projecting the fuel by a stream of primary air preheated to a temperature slightly below the ignition point of the fuel into a mixing chamber to flow therethrough into the combustion zone, and delivering secondary air preheated to a temperature above the ignition point of the fuel into the mixing chamber and causing the same to flow therethrough in the form of an annular envelope of secondary air surrounding the stream of primary air and fuel and flowing therewith into the combustion zone.

2. That method of forming a fuel mixture and delivering the same into a combustion zone which comprises projecting the fuel by a stream of primary air into a mixing chamber and directing the same to flow therethrough into the combustion zone, preheating the primary air to a temperature slightly below the ignition point of the fuel, delivering secondary air into the mixing chamber and directing the same to flow therethrough in the form of an annular column encircling the primary air and fuel, and preheating the secondary air prior to delivery into the mixing chamber to a temperature substantially above the ignition point of the fuel.

3. That method of forming a fuel mixture and delivering the same into a combustion zone which comprises projecting the fuel by a stream of primary air into a mixing chamber and directing the same to flow therethrough into the combustion zone, preheating the primary air to a temperature slightly below the ignition point of the fuel, delivering secondary air into the mixing chamber and directing the same to flow therethrough in the form of an annular column encircling the primary air and fuel, and preheating the secondary air prior to delivery into the mixing chamber to a temperature substantially above the ignition point of the fuel causing the primary air and fuel stream to swirl in a given direction as it flows through the mixing chamber toward the combustion zone and causing the encircling column of secondary air to swirl in the opposite direction as it flows through the mixing chamber toward the combustion zone.

4. The invention as defined in claim 2 characterized in that the secondary air is delivered into the mixing chamber rearwardly of the point of delivery of the primary air and fuel thereinto and directed to flow as an annular column toward the combustion zone surrounding the point of delivery of the primary air and fuel into the mixing chamber.

5. The invention as defined in claim 2 characterized in that the temperature of the primary air as it enters the mixing chamber is maintained below a determined maximum and the temperature of the secondary air as it enters the mixing chamber is maintained above a determined minimum.

6. Apparatus for forming and delivering a fuel mixture into a combustion kiln comprising, in combination with a kiln, a mixing chamber arranged at one end of the kiln and adapted to discharge thereinto, a primary air and fuel feed pipe leading into the mixing chamber and adapted to project a stream of fuel and primary air therethrough into the kiln, means for causing heated primary air to flow through said fuel feed pipe, means for maintaining the temperature of said primary air below a determined maximum, a secondary air pipe leading into the mixing chamber, means for causing heated air to flow through said secondary air pipe, and means for maintaining the temperature of said secondary air above a determined minimum.

7. Apparatus for forming and delivering a fuel mixture into a combustion kiln comprising, in combination with a kiln, a mixing chamber arranged at one end of the kiln and adapted to discharge thereinto, a fuel feed pipe leading into the mixing chamber and adapted to project a stream of fuel and primary air through the mixing chamber into the kiln, a source of heated air communicating with said pipe, means responsive to the temperature of the air flowing through said pipe adapted to maintain the temperature of said air below a determined maximum, a secondary air pipe leading into the mixing chamber, a source of heated air communicating with the secondary air pipe, and means responsive to the temperature of the air flowing through said pipe adapted to maintain the temperature of said air above a determined minimum.

HARRY S. LEE.